J. & W. CONNELL.
BRAKE LEVER.
APPLICATION FILED SEPT. 24, 1908.
930,045.
Patented Aug. 3, 1909.
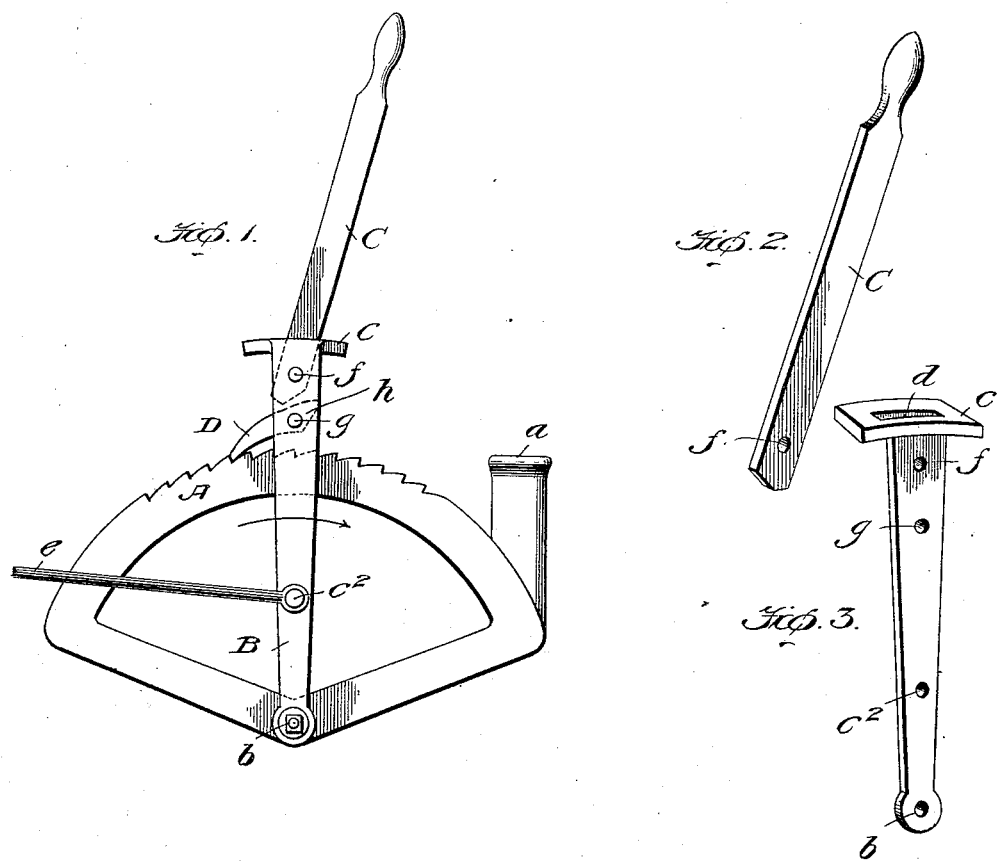
Witnesses
J. J. Sheehy.
Inventors
John Connell &
William Connell.
By James J. Sheehy
Attorney

UNITED STATES PATENT OFFICE.

JOHN CONNELL AND WILLIAM CONNELL, OF CLIMAX SPRINGS, MISSOURI.

BRAKE-LEVER.

No. 930,045.  Specification of Letters Patent.  Patented Aug. 3, 1909.

Application filed September 24, 1908. Serial No. 454,584.

*To all whom it may concern:*

Be it known that we, JOHN CONNELL and WILLIAM CONNELL, citizens of the United States, residing at Climax Springs, in the county of Camden and State of Missouri, have invented new and useful Improvements in Brake-Levers, of which the following is a specification.

Our invention pertains to brake levers for use on wagons and the like; and it contemplates a brake lever construction which is at once simple and compact, strong and convenient to operate, and is adapted to be applied to and used in combination with the ordinary segmental racks such as at present in general use.

The novelty, utility and practical advantages of the invention will be fully understood from the following description and claim, when the same are read in connection with the drawings, accompanying and forming part of this specification, in which:

Figure 1 is a side elevation illustrating our improvements as the same appear when positioned on a wagon body, and also illustrating in dotted lines the relative arrangement of the upper member of the lever and the pawl when the lever is placed to apply the brakes. Fig. 2 is a detail perspective view of the upper member of the lever comprised in our improvements. Fig. 3 is a detail view of the lower member of the said lever.

Similar letters designate corresponding parts in all of the views of the drawings, referring to which:

A is a segmental rack designed to be fixed in the ordinary or any other approved manner at one side of a wagon body (not shown), and having ratchet teeth on its upper edge. The said rack is also provided, by preference, with a whip socket $a$.

B is the lower member of the lever comprised in our improvements. C is the upper member of said lever, and D is a pawl with which the upper lever member is adapted to coöperate in the manner hereinafter set forth in detail.

As clearly shown in Fig. 1 the lower lever member B is pivoted at $b$ to the rack A and is provided at its upper end with a head or enlargement $c$ in which is a vertically disposed slot $d$ extending in the direction in which the member B is designed to be moved and arranged in a vertical plane at the inner side of the major portion of the member. At $c^2$ we prefer to connect the lever member B with an ordinary brake rod $e$, but it is obvious that the said lever member B may be connected with a brake beam in any other manner consonant with the purpose of our invention.

The upper lever member C is pivoted at $f$ to the lower member B and extends through and is adapted to swing in the slot $d$ of said member B. At its lower end and forward side the said upper lever member is beveled as shown with a view of avoiding interference with the pawl D when the lever is moved in the direction of the arrow in Fig. 1 to apply the brake and of disengaging the said pawl from the ratchet teeth of the rack when the lever is swung in the opposite direction to release the brake. The said pawl D is pivoted at $g$ to the upright major portion of the lever member B, and its point is arranged to engage the teeth of the rack A, while its tail $h$ is arranged in the path of the lower end of the upper lever member C so as to be depressed by said lower end when the upper arm of the member C is moved toward the left in Fig. 1.

In the practical use of our improvements it will be readily understood that movement of the upper arm of the member C toward the right will be attended by similar movement of the lower member B, this because of the bearing of the upper member against the right hand end wall of the slot $d$ in the enlargement $c$ on the lower member B. It will also be understood that the said movement of the lever members C and B will be attended by free riding of the pawl D over the teeth of the rack A, sufficient clearance for the vertical swinging movements of the said pawl being afforded between the same and the beveled lower end of the lever member C, and when the lever is moved to the extent desired the pawl will prevent casual retrograde movement thereof and consequently will hold the brakes on.

When the brakes are applied and the driver desires to release the same, it is simply necessary for him to swing the upper arm of the lever member C to the left or rearwardly, when, as will be manifest, the lower end of the said member C will by depressing the tail of the pawl D, move the said pawl out of engagement with the teeth of the rack, and then the lever as a whole may be moved or permitted to move rearwardly to the extent desired.

It will be gathered from the foregoing that the upper member C of the lever is the only element that need be grasped and operated by the driver; and it will also be gathered that by virtue of the arrangement of the said member C, relative to the lower member B, pressure on the lever member C in either direction is directly transmitted to the member B, and the construction as a whole is rendered strong and durable and this latter notwithstanding its simplicity and compactness.

When the lever member C is in the position shown by dotted lines in Fig. 1, the said lever member bears against the forward end wall of the slot $d$ in the lower lever member B, and ample room is afforded by the beveled end of the lever member C for the play of the pawl D necessary to the travel of the pawl in a forward direction over the teeth of the rack. It will also be observed in this connection that the rear and comparatively heavy portion of the pawl is, with the lever member C in the position shown in Fig. 1, always free to seat in one of the interdental spaces of the rack. On the other hand, when the upper arm of the lever member C is moved toward the left in Fig. 1, the lower beveled end of said lever member C moves to a position above the tail of the pawl D and engages said tail and depresses the same so that the rear portion of the pawl is raised from the rack and free movement of the lever member B toward the left in Fig. 1 is permitted.

By reference to Fig. 1 it will be seen that the pawl D is arranged at the inner side of lever member B and normally lies entirely in rear of the forward edge of said member B with the result that the latter serves to protect and lessen the liability of the tail of the pawl being broken while in use. It will also be observed that the lever member C acts after the manner of a cam against the upper edge of the pawl tail to depress said tail, and the tail does not offer any angular projection to the lever, but on the other hand the lever rests entirely above the pawl when the latter is disengaged from the rack.

Having described our invention, what we claim and desire to secure by Letters-Patent, is:

The brake lever construction described, comprising essentially the segmental rack, the lower lever member pivoted below the rack and movable at the outer side of the same, the pawl arranged above the rack and pivoted, at an intermediate point of its length, to the inner side of the member and normally lying entirely in rear of the forward edge of the member and having a tail the upper edge of which is smooth and free of projections throughout its length, and the upper lever member pivoted at an intermediate point of its length to the lower member, above the pawl, and movable to a limited extent with respect to the lower member and having its lower end beveled at its forward side and opposed to the upper edge of the pawl.

In testimony whereof we have hereunto set our hands in presence of two subscribing witnesses.

JOHN CONNELL.
WILLIAM CONNELL.

Witnesses:
JOHN R. BATCHELDER,
BEN. F. KING.